(12) United States Patent
Sakurai et al.

(10) Patent No.: US 9,331,580 B2
(45) Date of Patent: May 3, 2016

(54) SWITCHING POWER SUPPLY SYSTEM AND CONTROL CIRCUIT OF THE SWITCHING POWER SUPPLY SYSTEM

(71) Applicant: Fuji Electric Co., Ltd., Kawasaki-shi (JP)

(72) Inventors: Masahiko Sakurai, Hino (JP); Yukihiro Nishikawa, Hino (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 224 days.

(21) Appl. No.: 13/940,357

(22) Filed: Jul. 12, 2013

(65) Prior Publication Data

US 2014/0043868 A1 Feb. 13, 2014

(30) Foreign Application Priority Data

Aug. 10, 2012 (JP) ................. 2012-178644

(51) Int. Cl.
*H02M 3/335* (2006.01)
*H02M 1/00* (2007.01)

(52) U.S. Cl.
CPC .......... *H02M 3/335* (2013.01); *H02M 3/33507* (2013.01); *H02M 3/33515* (2013.01); *H02M 2001/0032* (2013.01); *Y02B 70/16* (2013.01)

(58) Field of Classification Search
CPC ................. H02M 2001/0035; H02M 3/33515
USPC ................. 363/21.02, 21.12, 21.16
See application file for complete search history.

(56) References Cited

U.S. PATENT DOCUMENTS

| | | | | |
|---|---|---|---|---|
| 6,078,510 | A  * | 6/2000 | Spampinato et al. | 363/21.13 |
| 6,972,970 | B2 * | 12/2005 | Yamada | 363/21.16 |
| 7,054,169 | B2 * | 5/2006 | Huh et al. | 363/21.16 |
| 7,064,966 | B2 * | 6/2006 | Yamada et al. | 363/21.16 |
| 7,492,619 | B2 * | 2/2009 | Ye et al. | 363/97 |
| 7,672,146 | B2 * | 3/2010 | Park et al. | 363/21.01 |
| 7,773,393 | B2 * | 8/2010 | Choi | 363/21.12 |
| 7,894,223 | B2 * | 2/2011 | Sato et al. | 363/97 |
| 8,169,800 | B2 * | 5/2012 | Moon et al. | 363/21.16 |
| 8,730,687 | B2 * | 5/2014 | Yang et al. | 363/21.02 |
| 2004/0037098 | A1 | 2/2004 | Konno | |
| 2006/0092671 | A1 | 5/2006 | Yamashita | |
| 2006/0098462 | A1* | 5/2006 | Usui | 363/21.01 |

(Continued)

FOREIGN PATENT DOCUMENTS

JP   2003-079146 A   3/2003
JP   2006-136034 A   5/2006

*Primary Examiner* — Gary L Laxton
*Assistant Examiner* — Kyle J Moody
(74) *Attorney, Agent, or Firm* — Rabin & Berdo, P.C.

(57) ABSTRACT

A switching power supply system includes a transformer having a primary winding, a secondary winding and a tertiary winding, a switching device inputted to the primary winding carrying out switching operation on the basis of a first control signal or a second control signal, an output voltage producing section rectifying and smoothing a voltage generated in the secondary winding to produce an output voltage, an output voltage detecting section producing an output voltage detection signal based on a voltage generated in the tertiary winding, a checking pulse generator generating pulses of the first control signal, and a switching controlling section producing the second control signal on the basis of the output voltage detection signal. The switching power supply system is capable of carrying out stable control of the output voltage on the secondary winding side of the transformer with a low power loss.

16 Claims, 6 Drawing Sheets

(56) References Cited

U.S. PATENT DOCUMENTS

| | | |
|---|---|---|
| 2007/0070659 A1* | 3/2007 | Sawtell ................. 363/21.01 |
| 2009/0021968 A1* | 1/2009 | Komatsu et al. ............ 363/126 |
| 2010/0008109 A1* | 1/2010 | Morota ................. 363/21.16 |
| 2010/0085781 A1* | 4/2010 | Saji et al. ............... 363/21.16 |
| 2010/0128501 A1* | 5/2010 | Huang et al. ............ 363/21.16 |
| 2010/0194198 A1* | 8/2010 | Djenguerian et al. ......... 307/31 |
| 2011/0090718 A1* | 4/2011 | Morota ................. 363/21.12 |
| 2013/0141946 A1* | 6/2013 | Sakurai et al. ........... 363/21.16 |
| 2013/0141947 A1* | 6/2013 | Sakurai et al. ........... 363/21.16 |
| 2013/0223107 A1* | 8/2013 | Zhang et al. ............ 363/21.16 |
| 2014/0078790 A1* | 3/2014 | Lin et al. ............... 363/21.16 |

* cited by examiner

SWITCHING POWER SUPPLY SYSTEM AND CONTROL CIRCUIT OF THE SWITCHING POWER SUPPLY SYSTEM

BACKGROUND OF THE INVENTION

1. Field of the Invention

The present invention relates to a switching power supply, which is a flyback switching power supply detecting a voltage generated in a tertiary winding of a transformer to carry out control on the basis of the detected voltage so that the value of an output voltage of a secondary winding of the transformer becomes a specified value, and the control circuit of the switching power supply.

2. Background Art

Previously, for a power supply system for a battery charger and a power supply system for an AC adapter for a notebook computer, a switching power supply system has been used which carries out control so that a supply voltage for a load becomes constant. Moreover, with the trend of promoting energy-saving, reduction in stand-by power, consumed with an electrical appliance being connected to an outlet, becomes a major problem.

One measure for solving the problem is to reduce a switching frequency when an electric appliance is in a light load state or a no load state as a stand-by state, by which a switching loss is reduced to reduce the stand-by power consumption. In JP-A-2003-079146, for example, a measure for reducing stand-by power consumption is described. According to the measure, an intermittent operation is carried out in which a series of switching pulse signals are continuously supplied when the value of a feedback voltage on the secondary winding side output becomes smaller than a specified value and the supply of a series of the switching pulse signals is stopped when the value of the feedback voltage becomes larger than the specified value. The measure is effective in an output voltage control system in which a secondary winding side output voltage is directly fed back by using an optical insulating device such as a photocoupler.

In JP-A-2006-136034, for example, a measure like the following is described. According to the measure, when it is decided by an output signal of a photocoupler that a load is a light load (an output voltage is high), a switching operation by a switching device is stopped for a certain specified period and, when it is decided in the period of making the switching operation stopped by an output signal of the photocoupler that the output signal is lowered, the switching device is turned-on by a trans-resetting detection signal outputted when a resonant voltage on the primary winding side becomes zero as a result of detection of the output of the tertiary winding after the switching operation is brought into the period of being stopped.

However, a photocoupler is expensive and has more than a few problems with respect to long-term reliability. Therefore, a switching power supply system is desirably formed without using a photocoupler. For a measure implemented in such a system, a secondary winding side output is detected from a voltage such as a voltage of a tertiary winding to control an output voltage. The measure, however, has the following problems.

Figure 6:
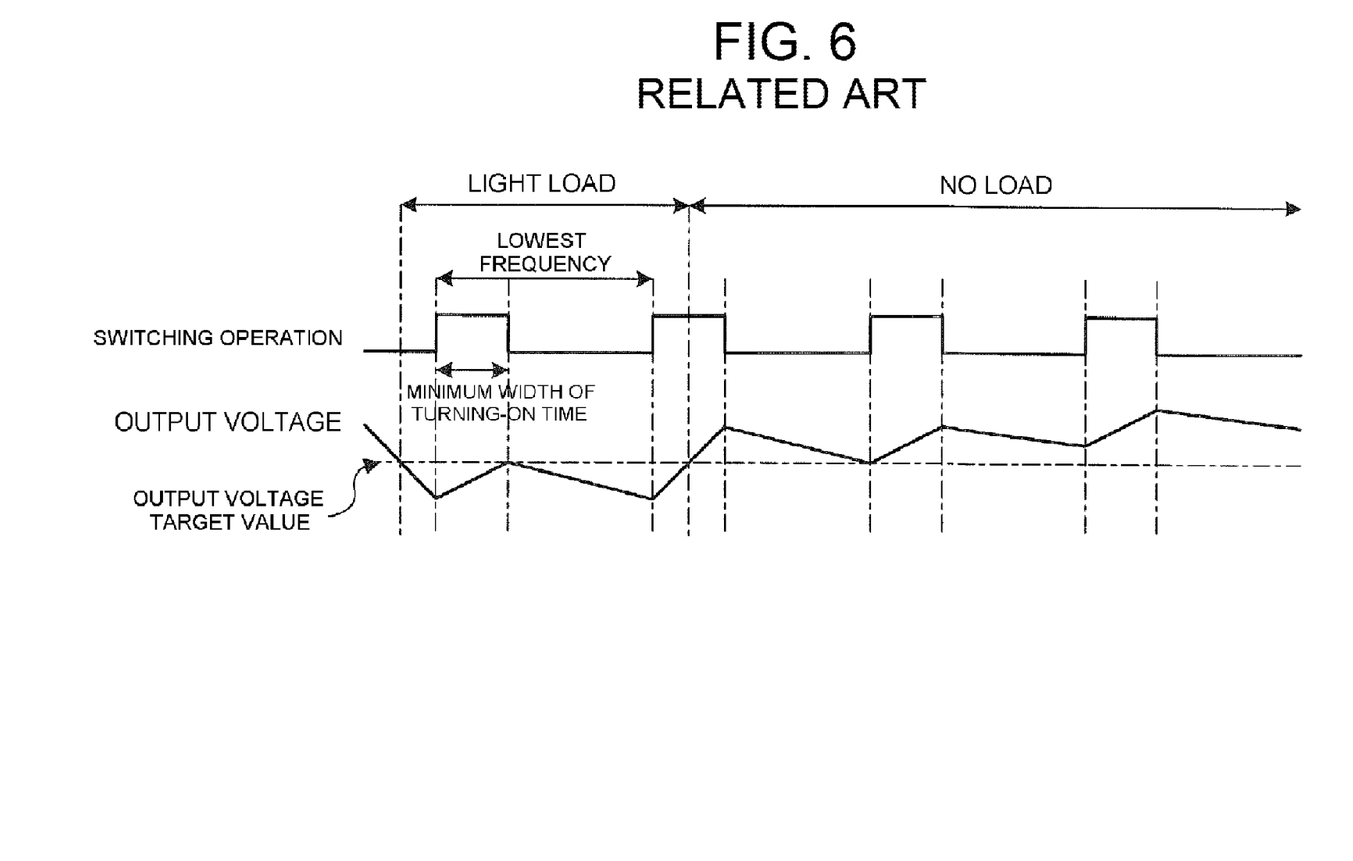
FIG. 6 is a timing chart showing operations of a related switching power supply system.

First, in the measure of reducing stand-by power consumption by decreasing a switching frequency into a stand-by state, as is shown in FIG. 6 (a timing chart showing operations of a related switching power supply system), for preventing a faulty operation due to a surge current at the turning-on of a switching device, the minimum width of the turning-on time in the switching operation is widely determined to some extent. This is to cause the amount of energy determined by the minimum width of the turning-on time and the lowest frequency in the switching operation to be transmitted to the secondary winding side. The amount of the transmitted energy, however, cannot be consumed when the secondary winding side is provided with a light load or no load to cause an increase in the output voltage, by which a problem occurs in that no output voltage can be controlled to be at a constant level.

To prevent this, a bleeder can be connected across the output side for suppressing an increase in the output voltage to keep the level of the output voltage at a constant level. In this case, however, a power loss in the bleeder becomes large enough to make it impossible to reduce stand-by power consumption.

Moreover, in the system of carrying out an intermittent operation described in JP-A-2003-079146, there is the presence of operation stopping periods because the switching operation supplying a series of the switching pulse signals is stopped when the value of the feedback voltage on the secondary winding side becomes larger than a specified value as was explained in the foregoing. In the system, a primary winding control is carried out in which information on an output voltage on the secondary winding side is detected by carrying out a switching operation on the primary winding side. Thus, once the switching operation is stopped, no output voltage can be detected for some time. This causes a problem in that the switching operation is kept stopped until the voltage across a holding capacitor in a sample hold circuit, included on the secondary winding side, decreases to be below an instruction value to considerably lower the output voltage.

A system of making an intermittent operation (a burst operation) carried out by using no photocoupler in a switching power supply using a transformer will be capable of determining a period during which an operation is stopped with the use of a timer as is described in JP-A-2006-136034. In the system, however, the period of stopping an operation is individually determined depending on the condition of a power supply system being used, posing the problem that a short period of stopping the operation makes energy-saving impossible and a long period of stopping the operation makes it impossible to ensure a required output voltage.

SUMMARY OF THE INVENTION

The invention was made for solving at least a part of the foregoing problems and is capable of actualizing a switching power supply system and a control circuit of the switching power supply in the following forms.

For solving the foregoing problems, a switching power supply system according to a first form of the invention includes a transformer provided with a primary winding to which a DC voltage is inputted, a secondary winding wound in the direction opposite to the winding direction of the primary winding and a tertiary winding wound in the direction opposite to the winding direction of the primary winding.

The switching power supply system according to the first form of the invention further includes a switching device connected to the primary winding to carry out switching operations on the basis of a first control signal of a series of pulses and a second control signal, and an output voltage producing section rectifying and smoothing a voltage generated in the secondary winding to produce an output voltage.

The switching power supply system according to the first form of the invention further includes an output voltage detecting section detecting a voltage generated in the tertiary winding to produce an output voltage detection signal based on the detected voltage, a checking pulse generator generating the pulses of the first control signal at specified first intervals, and a switching controlling section producing the second control signal on the basis of the output voltage detection signal to control the switching operations of the switching device.

According to the first form, the checking pulse generator generates the first control signal of a series of the pulses at specified first intervals. This enables stable detection of the output voltage to make the switching controlling section output the second control signal on the basis of the result of the detection to allow the output voltage to be stably outputted with a low power loss.

For solving the foregoing problems, in the switching power supply system according to a second form of the invention, the pulse width of the pulse of the first control signal is determined so as to satisfy the time length which the output voltage detecting section requires for carrying out sampling of a voltage generated in the tertiary winding by the pulse of the first control signal in the switching power supply system according to the first form.

According to the second form, the pulse width of the pulse of the first control signal is determined so as to satisfy the time length required for carrying out sampling of a voltage as the basis of the output voltage detection signal. Therefore, the pulses of the first control signal generated at the specified first intervals by the checking pulse generator allow the output voltage to be stably detected. Since the switching controlling section outputs the second control signal on the basis of the result of the detection, the output voltage can be stably outputted with low power loss.

For solving the foregoing problems, in a switching power supply system according to a third form of the invention, the first interval is longer than each of intervals at which the second control signal is generated in the switching power supply system according to the first or the second form.

According to the third form, the pulses of the first control signal generated at the specified first intervals by the checking pulse generator allow the output voltage to be stably detected. Since the switching controlling section outputs the second control signal on the basis of the result of the detection, the output voltage can be stably outputted with low power loss.

For solving the foregoing problems, in a switching power supply system according to a fourth form of the invention, the switching controlling section includes a burst circuit that lengthens the width of the second control signal in a light load state in the switching power supply system according to any one of the first to third forms.

According to the fourth form, the generation of the pulses of the first control signal at the specified first intervals by the checking pulse generator allows the output voltage to be stably detected. Since the switching controlling section can lengthen the width of the second control signal by the burst circuit, the number of times the switching device carries out switching operations can be decreased to permit the output voltage to be stably outputted with low power loss.

For solving the foregoing problems, in a switching power supply system according to a fifth form of the invention, the checking pulse generator, the switching controlling section and the output voltage detecting section are formed on the same semiconductor substrate in the switching power supply system according to any one of the first to fourth forms.

According to the fifth form, the switching power supply system and the control circuit of the switching power supply system can be formed at low cost.

For solving the foregoing problems, a control circuit of a switching power supply system according to a sixth form of the invention is the control circuit of a switching power supply system having a transformer provided with a primary winding to which a DC voltage is inputted, a secondary winding wound in the direction opposite to the winding direction of the primary winding, and a tertiary winding wound in the direction opposite to the winding direction of the primary winding.

The control circuit of the switching power supply system according to the sixth form of the invention further includes a switching device connected to the primary winding to carry out switching operations on the basis of a first control signal of a series of pulses and a second control signal, and an output voltage producing section rectifying and smoothing a voltage generated in the secondary winding to produce an output voltage.

The control circuit of the switching power supply system according to the sixth form of the invention further includes an output voltage detecting section detecting a voltage generated in the tertiary winding to produce an output voltage detection signal based on the detected voltage, a checking pulse generator generating the pulses of the first control signal at specified first intervals, and a switching controlling section producing the second control signal on the basis of the output voltage detection signal to control the switching operations of the switching device.

According to the sixth form, the pulses of the first control signal generated at the specified first intervals by the checking pulse generator allow the output voltage to be stably detected. Since the switching controlling section outputs the second control signal on the basis of the result of the detection, a control circuit of a switching power supply system, capable of stably outputting the output voltage with a low power loss, can be formed at low cost.

According to the invention, the pulses of the first control signal generated at the specified first intervals by the checking pulse generator allow the output voltage to be stably detected. Since the switching controlling section outputs the second control signal on the basis of the result of the detection, the output voltage can be stably outputted with low power loss without the use of a photocoupler.

DETAILED DESCRIPTION

In the following, embodiments of the switching power supply system of the invention will be explained according to the attached drawings. In the drawings referred to in the following, parts being equivalent to those in other drawings will be explained while being designated by the same reference numerals and signs.

First Embodiment

Figure 1:
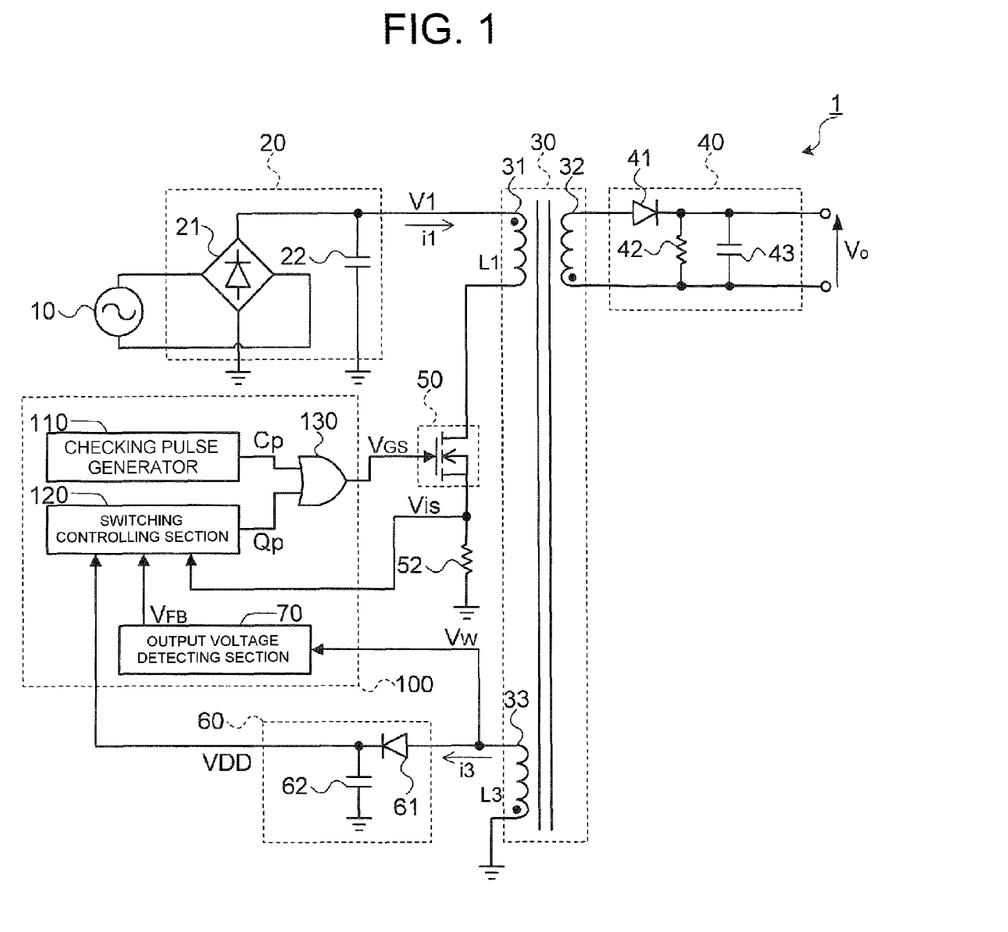
FIG. 1 is a circuit diagram showing the configuration of the switching power supply system according to a first embodiment of the invention.

First, the configuration of a switching power supply system according to the first embodiment of the invention will be explained with reference to FIG. 1. FIG. 1 is a circuit diagram showing the configuration of the switching power supply system according to the first embodiment of the invention.

As is shown in FIG. 1, the switching power supply system is formed of an input voltage producing section 20, a transformer 30, an output voltage producing section 40, a switching device 50, a resistor 52, a tertiary power supply 60 and a control circuit 100. The control circuit 100 is formed of an output voltage detecting section 70, a checking pulse generator 110, a switching controlling section 120 and an OR circuit 130. Here, the foregoing constituents of the control circuit 100 are formed on the same semiconductor substrate.

The input voltage producing section 20 includes a diode bridge circuit 21 and a capacitor 22 to rectify and smooth the AC voltage of an AC power supply 10, by which a DC voltage V1 is produced. The transformer 30 has a primary winding 31, a secondary winding 32 and a tertiary winding 33 which are wound on the same core. The secondary winding 32 and the tertiary winding 33 are wound in the direction opposite to the winding direction of the primary winding 31. The output voltage producing section 40 includes a diode 41, a resistor 42 and a capacitor 43 to rectify and smooth the voltage produced in the secondary winding 32, by which an output voltage Vo is produced.

The switching device 50 is formed with a transistor such as a PMOS transistor or an NMOS transistor (FIG. 1 shows an NMOS transistor as an example). The switching device 50 has a drain terminal connected to one end of the primary winding 31 of the transformer 30, a source terminal connected to one end of the resistor 52 and a gate terminal to which a control signal VGS outputted from the OR circuit 130 is inputted. The other end of the resistor 52 is grounded. The tertiary power supply 60 includes a diode 61 and a capacitor 62 to rectify and smooth the voltage Vw produced in the tertiary winding 33, by which a DC power supply voltage VDD is produced.

The output voltage detecting section 70 divides the voltage Vw generated in the tertiary winding 33, carries out sampling of the divided voltage at specified sampling intervals and holds the voltage sampled immediately after the switching device 50 is brought into a nonconductive (turned-off) state. The reason of holding the voltage will be explained later. The state of holding the voltage is continued up to the time at which the switching device 50 is brought into the next nonconductive (turned-off) state. The difference between the held voltage value and a reference voltage, which difference corresponds to the output voltage target value (e.g., instruction value) of the output voltage Vo, is amplified by an unillustrated normal error amplifier, by which an output voltage detection signal VFB as a feedback voltage is produced. The output voltage detection signal VFB becomes larger as the value of the output voltage Vo becomes lower than the instruction value and becomes smaller as the difference between the value of the output voltage Vo and the instruction value becomes smaller.

As was explained in the foregoing, the output voltage detecting section 70 initiates the sampling of the divided voltage of the voltage Vw when the switching device 50 is brought into a conductive (turned-on) state. The voltage Vw, as will be explained in the following, continues even after the switching device 50 is brought into a nonconductive (turned-off) state until the energy in the transformer 30, stored while the switching device 50 is in conduction by the pulse of the first control signal Cp, is released to the secondary winding 32 and the tertiary winding 33 to become zero. The voltage Vw, however, initiates an oscillation (e.g., resonance) when the transformer 30 fully releases all of the energy stored therein. For preventing this, the output voltage detecting section 70 holds a voltage sampled immediately after the switching device 50 is brought into in the nonconductive (turned-off) state. This makes the output voltage detection signal VFB, the value of which corresponds to the value of the held voltage, outputted from the output voltage detecting section 70. Since the secondary winding 32 and the tertiary winding 33 are wound in the same direction, the voltage generated in the secondary winding 32 and the voltage Vw generated in the tertiary winding 33 are in proportion to each other.

The checking pulse generator 110 generates pulses of a first control signal Cp of a series of pulses at specified first intervals. The pulse width of the pulse of the first control signal Cp is determined to be such a width as to continue for a time duration which the output voltage detecting section 70 requires to carry out sampling of the voltage Vw generated in the tertiary winding 33.

Here, the duration during which the voltage Vw is generated in the tertiary winding 33 and the pulse width of the pulse of the first control signal Cp are not equal to each other. The duration in which the voltage Vw is generated in the tertiary winding 33 is the length of a time during which the energy, stored in the transformer 30 while the switching device 50 is in conduction by the pulse of the first control signal Cp, is fully released to the secondary winding 32 and the tertiary winding 33 to become zero after the switching device 50 is brought into a nonconductive state. An example of a measurement shows that a duration of the voltage Vw generated in the tertiary winding 33 becomes three to five times the pulse width of the pulse of the first control signal Cp. Therefore, the pulse width of the pulse of the first control signal Cp may be short, so that the pulse width of the pulse of the first control signal Cp can be made considerably short to make the energy stored in the transformer the smallest possible. Furthermore, because the timing of generating the pulse of the first control signal Cp can be freely determined, an appropriate pulse generating interval can be determined according to an application.

The switching controlling section 120 generates a second control signal Qp on the basis of a device voltage Vis at the source terminal of the switching device 50 and the output voltage detection signal VFB generated by the output voltage detecting section 70. The device voltage Vis becomes a voltage based on a current flowing in the switching device 50. The OR circuit 130 outputs the control signal VGS to the gate of the switching device 50. The control signal VGS is a signal into which the pulse of first control signal Cp and the second control signal Qp are ORed.

Figure 2:
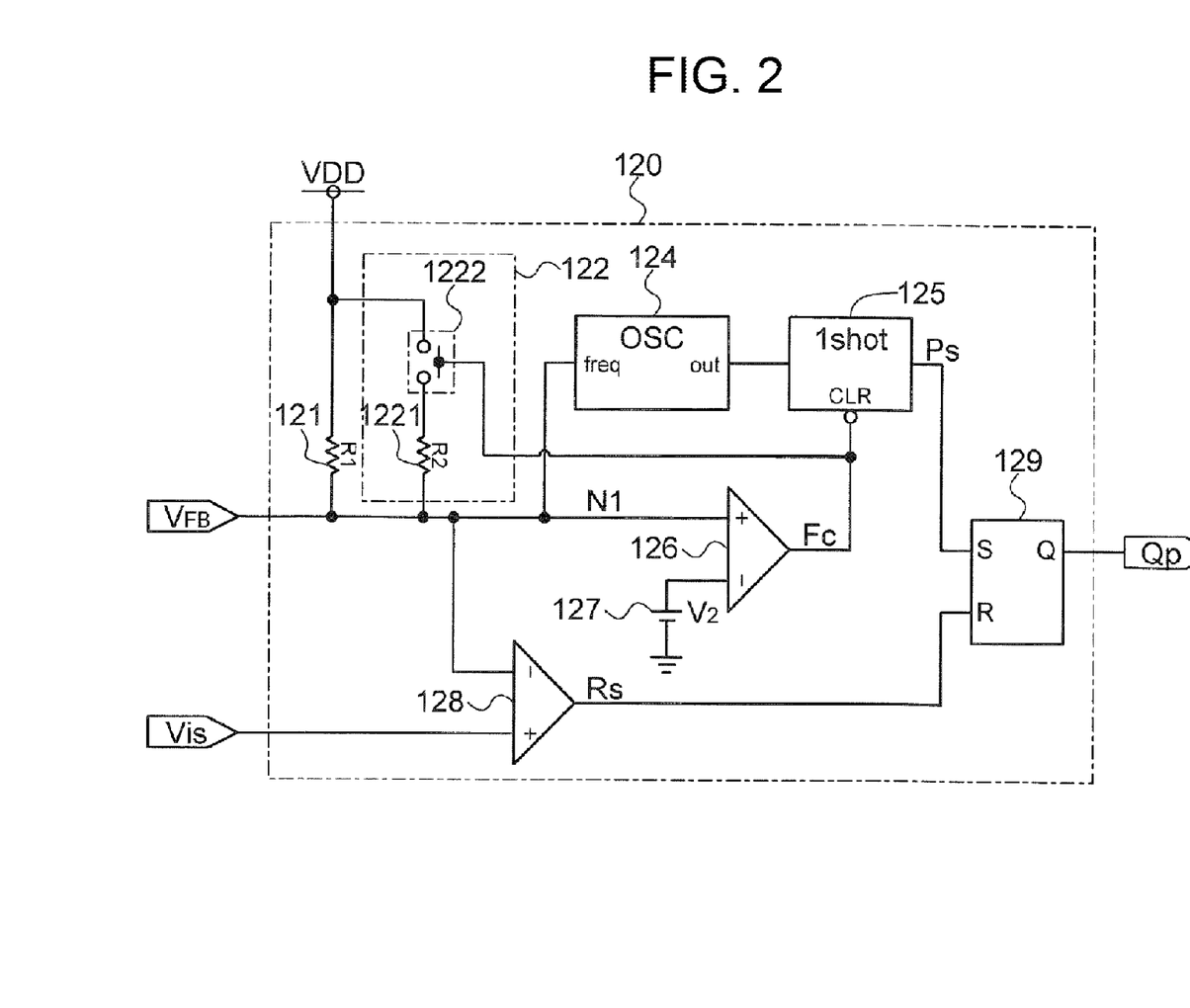
FIG. 2 is a circuit diagram showing the configuration of the switching controlling section of the switching power supply system according to the first embodiment of the invention.

Next, the configuration of the switching controlling section of the switching power supply system according to the first embodiment will be explained with reference to FIG. 2. FIG. 2 is a circuit diagram showing the configuration of the switching controlling section of the switching power supply system according to the first embodiment of the invention.

As is shown in FIG. 2, the switching controlling section 120 is formed of a resistor 121, a burst circuit 122, an oscillator 124, a one-shot circuit 125, comparators 126 and 128, a constant voltage source 127 outputting a specified constant voltage and an RS flip-flop 129. The burst circuit 122 is formed of a resistor 1221 and a switching circuit 1222.

The resistor 121 is connected between the tertiary power supply 60 shown in FIG. 1 for the DC power supply voltage VDD and a wiring N1 to which the output voltage detection signal VFB is inputted. The switching circuit 1222 and the resistor 1221 are connected in series between the tertiary power supply 60 for the DC power supply voltage VDD and the wiring N1. The switching circuit 1222 is brought into a conductive state when a signal Fc is at an H (high) level which signal is outputted from the comparator 126 as the result of a comparison and brought into a nonconductive state when the signal Fc is at an L (low) level. Each of the resistor 121 and the resistor 1221 is a pull-up resistor for the wiring N1 into which the output voltage detection signal VFB is inputted. The voltage of the wiring N1 (VFB) becomes lower as the resistance value of the pull-up resistor becomes larger and becomes higher as the resistance value of the pull-up resistor becomes smaller. Namely, the switching circuit 1222 brought into conductive state connects the resistor 1221 in parallel to the resistor 121, by which the resistance value of the pull-up resistor becomes smaller to raise the voltage of the wiring N1 (VFB). The switching circuit 1222 brought into a nonconductive state forms the pull-up resistor only with the resistor 121, by which the resistance value of the pull-up resistor becomes larger to lower the voltage of the wiring N1 (VFB).

The oscillator 124 has the output voltage detection signal VFB inputted to a control terminal "freq" thereof to output a signal with a frequency based on the level of the output voltage detection signal VFB from the output terminal "out" to the one-shot circuit 125. The one-shot circuit 125 is triggered by the signal outputted by the oscillator 124 to output a one-shot pulse Ps to the set terminal S of the RS flip-flop 129 every period of the signal. The one-shot circuit 125 is further provided with a CLR terminal to which the signal Fc is inputted which is outputted by the comparator 126. The one-shot circuit 125 outputs no one-shot pulse Ps during a period during which the signal Fc is at the L-level.

The comparator 126 has the output voltage detection signal VFB inputted to the non-inverting input terminal thereof and has the constant voltage source 127 (with the voltage value V2) connected to the inverting input terminal thereof with the result of comparison between the voltage value of the output voltage detection signal VFB and the voltage value V2 outputted as the signal Fc. The comparator 128 has the device voltage Vis inputted to the non-inverting input terminal thereof and has the output voltage detection signal VFB inputted to the inverting input terminal thereof. The result of comparison between the value of the device voltage Vis and the voltage value of the output voltage detection signal VFB is outputted as a signal Rs to the reset terminal R of the RS flip-flop 129. The RS flip-flop 129 outputs a second control signal Qp from the output terminal Q.

Figure 3:
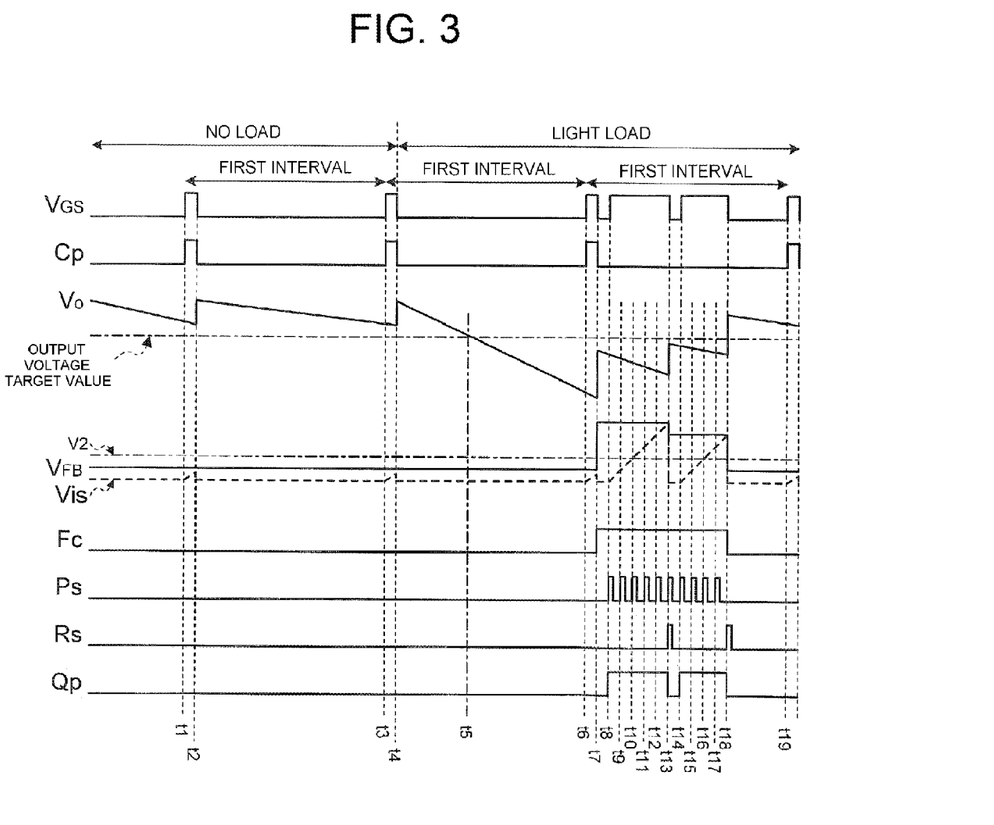
FIG. 3 is a timing chart showing operations of the switching power supply system according to the first embodiment of the invention.

Next, the operation of the switching power supply according to the first embodiment will be explained with reference to FIG. 3. FIG. 3 is a timing chart showing operations of the switching power supply system according to the first embodiment of the invention.

In FIG. 3, in a period up to the time t4, the switching power supply system 1 is in a no load state, in which the value of the output voltage Vo is above the output voltage target value. In a period after the time t4, the switching power supply system 1 is in a light load state, in which the value of the output voltage Vo is going to be below the output voltage target value.

First, an operation of the switching power supply system 1 in the no load state will be explained. In the control circuit 100, the checking pulse generator 110 repeatedly generates the pulses of the first control signal Cp, each with a pulse width from the time t1 to the time t2, at first intervals each being from the time t1 to the time t3. The pulse of the first control signal Cp generated from the time t1 to the time t2 is inputted to one of the input terminals of the OR circuit 130. To the other input terminal of the OR circuit 130, the second control signal Qp is inputted.

When the value of the output voltage Vo exceeds the output voltage target value, the second control signal Qp is at the L level as will be explained later. Hence, the OR circuit 130 outputs the pulsed control signal VGS at the H level similar to the pulse of the first control signal Cp, by which the switching device 50 is brought into a conductive state to increase the device voltage Vis from the time t1 along with an elapsed time. However, the pulse width of the pulse of the first control signal Cp is determined so that the value of the increased device voltage Vis is still below the value of the output voltage detection signal VFB at the termination time t2 of the pulse of the first control signal Cp. Thus, no signal Rs becomes a signal at the H level.

Moreover, the capacitor 43, charged by the voltage generated in the secondary winding 32 from the time t1 to the time t2 on the basis of the pulse of the first control signal Cp, brings the value of the output voltage Vo as the voltage across the capacitor 43 to become the maximum value at the time t2.

At the time t2, the termination of the pulse of the first control signal Cp brings the switching device 50 into a nonconductive state, by which the device voltage Vis returns to the ground voltage through the resistor 52. Moreover, from the time t2, the output voltage detecting section 70 carries out sampling of the voltage Vw generated in the tertiary winding 33 to produce the output voltage detection signal VFB.

When the value of the output voltage Vo exceeds the output voltage target value, the voltage value of the output voltage detection signal VFB is small. Thus, the value of the voltage V2 of the constant voltage source 127 is determined so as to always exceed the small voltage value of the output voltage detection signal VFB. Hence, at the time t2, the signal Fc outputted from the comparator 126 is left at the L level. Therefore, the switching circuit 1222 is in the nonconductive state and the one-shot circuit 125 outputs no one-shot pulse Ps. Furthermore, the device voltage Vis inputted to the non-inverting input terminal of the comparator 128 has returned to the ground voltage from the increased state of being still below the value of the output voltage detection signal VFB, by which the signal Rs outputted from the comparator 128 is also left at the L level. Hence, the RS flip-flop 129 has the L level signals inputted to both of the set terminal S and the reset terminal R to leave the outputted second control signal Qp at the L level.

After the time t2, the primary winding has no input, by which no output is provided from the secondary winding 32. This causes the capacitor 43, charged between the time t1 and the time t2, to discharge through the resistor 42. The discharge, however, is gradual in the no load state to result in a gradual decrease in the value of the output voltage Vo from the maximum value at the time t2. At the time t3 at which the value of the output voltage Vo is still above the output voltage target value, the pulse of the next first control signal Cp is generated to bring the value of the output voltage Vo at the time t4 to return to the maximum value equal to that at the time t2.

The operation from the time t3 to the time t4 is the same as the operation from the time t1 to the time t2. Moreover, the operation before the time t1 is the same as the operation from after the time t2 to the time t3.

Subsequent to this, an operation of the switching power supply system 1 in the light load state will be explained. A light load is to be applied to the switching power supply system 1 after the time t4, at which the switching device 50 is brought into a nonconductive state. After the time t4, the primary winding 31 has no input by which no output is provided from the secondary winding 32. This causes the capacitor 43, charged between the time t3 and the time t4, to discharge through the resistor 42 and the light load connected in parallel to the resistor 42. Hence, the value of the output voltage Vo rapidly decreases from the time t4 compared with the case in the no load state to be equal to the output voltage target value at the time t5 and to thereafter become largely below the output voltage target value.

As was explained in the foregoing, the voltage Vw at the end of the no load state immediately after the time t4, at which the switching device 50 is brought into the nonconductive state, is detected, divided and thereafter sampled to be held by the output voltage detecting section 70 until the time t7 at which the switching device 50 is brought into the next nonconductive state. Therefore, until the time t7, the output voltage detecting section 70 outputs the output voltage detection signal VFB the value of which is below the voltage value V2 of the constant voltage source 127 on the basis of the voltage sampled at the end of the no load state.

Thereafter in this state, the checking pulse generator 110 generates the pulse of the first control signal Cp in a period from the time t6 to the time t7.

At the time t7, the capacitor 43, being charged by the voltage generated in the secondary winding 32 on the basis of the pulse of the first control signal Cp, brings the value of the output voltage Vo as the voltage across the capacitor 43 to rapidly increase from a value largely below the output voltage target value. The increased output voltage Vo, however, is left to be still below the output voltage target value. After the time t7, the output voltage Vo rapidly decreases like the output voltage Vo after the time t4.

Moreover, at the time t7, the output voltage Vo is detected with the value thereof being largely below the output voltage target value, by which the value of the output voltage detection signal VFB becomes large as was explained in the foregoing. This results in a rapid increase at the time t7 in the output voltage detection signal VFB which has been held at a low value until the time t7, by which the output voltage detection signal VFB comes to be held as a voltage with the value thereof being above the value of the voltage V2.

The voltage value of the output voltage detection signal VFB becoming above the voltage value V2 at the time t7 brings the level of the signal Fc to be shifted to the H level. The signal Fc with the level thereof shifted to the H level brings the switching circuit 1222 into a conductive state in which the resistor 1221 is added between the tertiary power supply 60 for the DC power supply voltage VDD and the wiring N1. Thus, the resistance value R between the tertiary power supply 60 for the DC power supply voltage VDD and the wiring N1 becomes R=1/((1/the resistance value R1 of the resistor 121)+(1/the resistance value R2 of the resistor 1221)). The voltage of the output voltage detection signal VFB further increases at the time t7 due to the reduction in resistance value R of the pull-up resistor becoming smaller than the resistance value R1 of the resistor 121.

The signal Fc with the level thereof shifted to the H level at the time t7 brings the one-shot circuit 125 to be triggered by the signals outputted from the oscillator 124 to generate one shot pulse Ps at each of the times from the time t8 to the time t17. The one-shot pulse Ps generated at the time t8 is inputted to the set terminal S of the RS flip-flop 129, by which the level of the second control signal Qp is shifted to the H level. The second control signal Qp is outputted from the RS flip-flop 129 to the outside of the output voltage detecting section 70 to be inputted to the OR circuit 130.

The second control signal Qp with the level thereof shifted to the H level from the time t8 makes the control signal VGS at the H level generated through the OR circuit 130, by which the switching device 50 is brought into a conductive state to raise the device voltage Vis.

At the time t13, the value of the device voltage Vis is raised to become equal to the value of the output voltage detection signal VFB. Then, the signal Rs is outputted from the comparator 128. The signal Rs inputted to the reset terminal R of the RS flip-flop 129 resets the RS flip-flop 129, by which the level of the second control signal Qp is shifted to the L level. At the time t13, no pulse of the first control signal Cp is outputted from the checking pulse generator 110. This brings the level of the control signal VGS outputted from the OR circuit 130 to the L level, by which the switching device 50 is brought into a nonconductive state to lower the device voltage Vis down to the ground voltage.

In the period from the time t8 to the time t13, the switching device 50 was in a conductive state. Hence, at the time t13 at which the switching device 50 is brought into the nonconductive state, the capacitor 43 is charged by a voltage induced in the secondary winding 32, by which the output voltage Vo is increased before being decreased. In this case, however, the increased output voltage Vo is still below the output voltage target value. Thus, the output voltage detection signal VFB still has a large value exceeding the voltage V2. This makes the level of the signal Fc, outputted from the comparator 126, held at the H level. Here, the output voltage Vo at each of the times t2, t4, t7, t13 and t18, although it is to increase with a certain inclination with respect to an elapsed time by nature (e.g., has a natural slope while increasing), is illustrated in FIG. 3 as though it increases instantaneously for simplifying the explanations.

At the time t14, the level of the signal Fc is held at the H level. Hence, the one-shot pulse Ps generated at the time t14 is inputted to the S terminal of the RS flip-flop 129 being reset. This makes the second control signal Qp, the level of which became the L level at the time 13, outputted from the RS flip-flop 129 to the outside of the output voltage detecting section 70 to be inputted to the OR circuit 130 with the level thereof shifted to the H level from the time t14.

The second control signal Qp with the level thereof shifted to the H level from the time t14 makes the control signal VGS generated through the OR circuit 130 shift to the H level, by which the switching device 50 is brought into a conductive state to raise the device voltage Vis.

At the time t18, the value of the device voltage Vis is raised to become equal to the value of the output voltage detection signal VFB. Then, the signal Rs is outputted from the comparator 128. The signal Rs inputted to the reset terminal R of the RS flip-flop 129 resets the RS flip-flop 129, by which the level of the second control signal Qp is shifted to the L level. At the time t18, no first control signal Cp is outputted from the checking pulse generator 110. This brings the level of the control signal VGS outputted from the OR circuit 130 to the L level, by which the switching device 50 is brought into a nonconductive state to lower the device voltage Vis down to the ground voltage.

In the period from the time t14 to the time t18, the switching device 50 was in a conductive state. Hence, at the time t18 at which the switching device 50 is brought into the nonconductive state, the capacitor 43 is charged by a voltage induced in the secondary winding 32, by which the output voltage Vo is increased to exceed the output voltage target value before being decreased while exceeding the output voltage target value. Along with this, the value of the output voltage detection signal VFB becomes below the voltage value V2. This brings the level of the output signal Fc, outputted from the comparator 126, to the L level to cause the one-shot circuit 125 to stop the generation of the one-shot pulse Ps. Thus, both of the levels of the signals inputted to the set terminal and the reset terminal of the RS flip-flop 129 become the L levels to keep the level of the second control signal Qp at the L level. From the time t18 to the time t19, no pulse of the first control signal Cp is inputted. Hence, the state of the switching power supply system 1 becomes the state similar to that immediately after the time t4.

According to the first embodiment of the invention explained in the foregoing, advantages as will be explained in the following are obtained.

In the first embodiment, the checking pulse generator 110 generates the pulses of the first control signal Cp at specified first intervals to thereby allow the output voltage Vo to be stably detected. Moreover, the switching controlling section 120 outputs the second control signal Qp so that the value of the output voltage Vo becomes equal to or more than the output voltage target value only when the value of the output voltage detection signal VFB becomes equal to or more than the specified constant voltage value V2. Therefore, without the use of a photocoupler, the output voltage Vo can be stably outputted with a low power loss. Furthermore, the width of the second control signal Qp can be lengthened by the burst circuit 122. This can decrease the number of times the switching device 50 carries out switching operations to reduce power consumption.

The burst operation explained in the foregoing is not necessary for the switching power supply system according to the invention. Thus, an embodiment in which no burst operation is carried out will be explained in the following.

Second Embodiment

Figure 4:
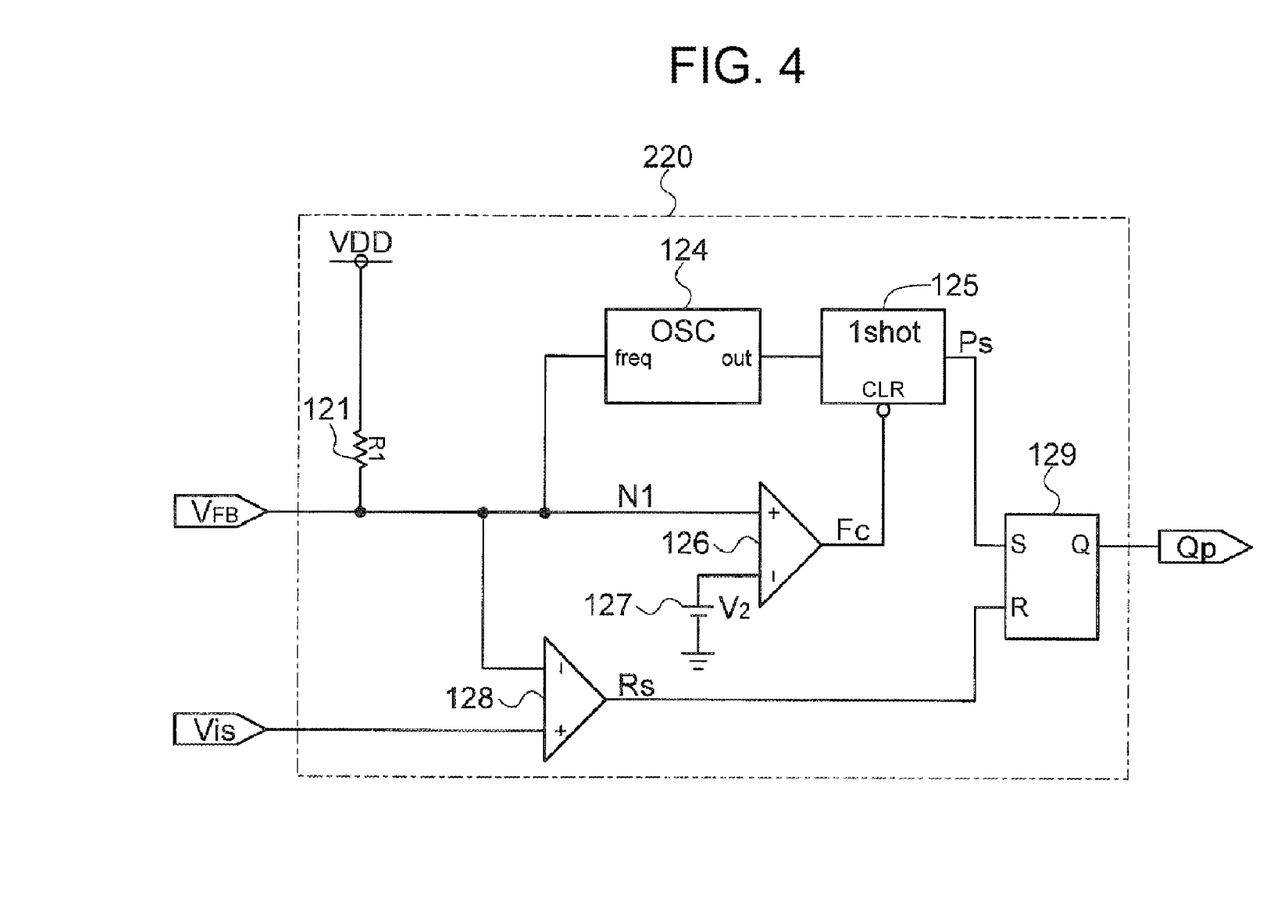
FIG. 4 is a circuit diagram showing the configuration of the switching controlling section of the switching power supply system according to the second embodiment of the invention.

Next, the configuration of the switching controlling section of the switching power supply system according to the second embodiment will be explained with reference to FIG. 4. FIG. 4 is a circuit diagram showing the configuration of the switching controlling section of the switching power supply system according to the second embodiment of the invention.

As is shown in FIG. 4, the switching controlling section 220 has a configuration in which the burst circuit 122 is removed from the switching controlling section 120 shown in FIG. 2. Moreover, the switching power supply system 1 according to the second embodiment is a system in which the switching controlling section 120 in the switching power supply system 1 shown in FIG. 1 is substituted by the switching controlling section 220.

Figure 5:
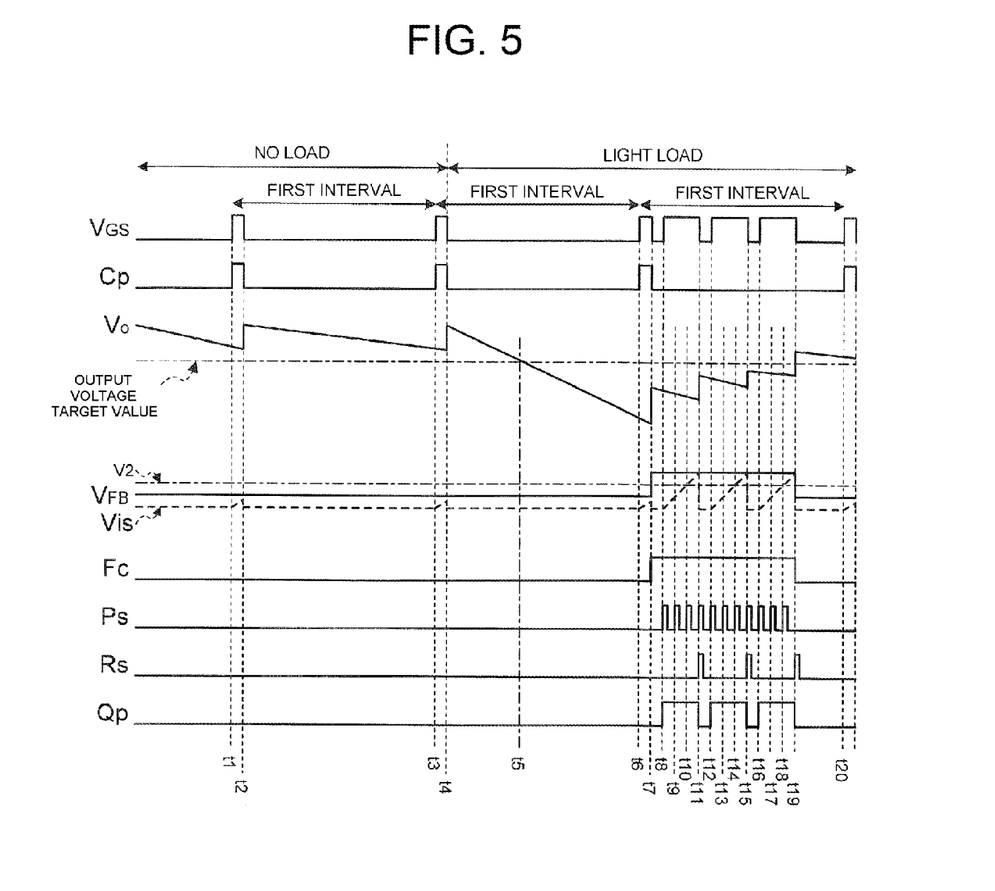
FIG. 5 is a timing chart showing operations of the switching power supply system according to the second embodiment of the invention.

Following this, the operation of the switching power supply according to the second embodiment will be explained with reference to FIG. 5. FIG. 5 is a timing chart showing operations of the switching power supply system according to the second embodiment of the invention.

In FIG. 5, the operation of the switching power supply system 1 according to the second embodiment in the no load state up to the time t4 is the same as the operation of the switching power supply system 1 according to the first embodiment in the no load state explained with reference to FIG. 3.

Subsequent to this, an operation of the switching power supply system 1 in the light load state will be explained. A light load is to be applied to the switching power supply system 1 after the time t4, at which the switching device 50 is brought into a nonconductive state. After the time t4, the primary winding 31 has no input by which no output is provided from the secondary winding 32. This causes the capacitor 43, charged between the time t3 and the time t4, to discharge through the resistor 42 and the light load connected in parallel to the resistor 42. Hence, the value of the output voltage Vo rapidly decreases from the time t4 compared with the case in the no load state to be equal to the output voltage target value at the time t5 and to thereafter become largely below the output voltage target value.

As was explained in the foregoing, the voltage Vw at the end of the no load state immediately after the time t4, at which the switching device 50 is brought into the nonconductive state, is detected, divided and thereafter sampled to be held by the output voltage detecting section 70 until the time t7 at which the switching device 50 is brought into the next nonconductive state. Therefore, until the time t7, the output voltage detecting section 70 outputs the output voltage detection signal VFB the value of which is below the voltage value V2 of the constant voltage source 127 on the basis of the voltage sampled at the end of the no load state.

Thereafter in this state, the checking pulse generator 110 generates the pulse of the first control signal Cp in a period from the time t6 to the time t7.

At the time t7, the capacitor 43, being charged by the voltage generated in the secondary winding 32 on the basis of the pulse of the first control signal Cp, brings the value of the output voltage Vo as the voltage across the capacitor 43 to rapidly increase from a value largely below the output voltage target value. The increased output voltage Vo, however, is left to be still below the output voltage target value. After the time t7, the output voltage Vo rapidly decreases like the output voltage Vo after the time t4.

Moreover, at the time t7, the output voltage Vo is detected with the value thereof being largely below the output voltage target value, by which the value of the output voltage detection signal VFB becomes large as was explained in the foregoing. This results in an increase at the time t7 in the output voltage detection signal VFB which has been held at a low value until the time t7, by which the output voltage detection signal VFB comes to be held as a voltage with the value thereof being above the value of the voltage V2.

The voltage value of the output voltage detection signal VFB becoming above the voltage value V2 at the time t7 brings the level of the signal Fc to be shifted to the H level.

The signal Fc with the level thereof shifted to the H level at the time t7 brings the one-shot circuit 125 to be triggered by the signals outputted from the oscillator 124 to generate one shot pulse Ps at each of the times from the time t8 to the time t18. The one-shot pulse Ps generated at the time t8 is inputted to the set terminal S of the RS flip-flop 129, by which the level of the second control signal Qp is shifted to the H level. The second control signal Qp is outputted from the RS flip-flop 129 to the outside of the output voltage detecting section 70 to be inputted to the OR circuit 130.

The second control signal Qp with the level thereof shifted to the H level from the time t8 makes the control signal VGS at the H level generated through the OR circuit 130, by which the switching device 50 is brought into a conductive state to raise the device voltage Vis.

At the time t11, the value of the device voltage Vis is raised to become equal to the value of the output voltage detection signal VFB. Then, the signal Rs is outputted from the comparator 128. The signal Rs inputted to the reset terminal R of the RS flip-flop 129 resets the RS flip-flop 129, by which the level of the second control signal Qp is shifted to the L level.

At the time t11, no pulse of the first control signal Cp is outputted from the checking pulse generator 110. This brings the level of the control signal VGS outputted from the OR circuit 130 to the L level, by which the switching device 50 is brought into a nonconductive state to lower the device voltage Vis down to the ground voltage.

In the period from the time t8 to the time t11, the switching device 50 was in a conductive state. Hence, at the time t11 at which the switching device 50 is brought into the nonconductive state, the capacitor 43 is charged by a voltage induced in the secondary winding 32, by which the output voltage Vo is increased before being decreased. In this case, however, the increased output voltage Vo is still below the output voltage target value. Thus, the output voltage detection signal VFB still has a value exceeding the voltage V2. This makes the level of the signal Fc, outputted from the comparator 126, held at the H level.

At the time t12, the level of the signal Fc is held at the H level. Hence, the one-shot pulse Ps generated at the time t12 is inputted to the S terminal of the RS flip-flop 129 being reset. This makes the second control signal Qp, the level of which became the L level at the time 11, outputted from the RS flip-flop 129 to the outside of the output voltage detecting section 70 to be inputted to the OR circuit 130 with the level thereof shifted to the H level from the time t12.

The second control signal Qp with the level thereof shifted to the H level from the time t12 makes the control signal VGS generated through the OR circuit 130 shift to the H level, by which the switching device 50 is brought into a conductive state to raise the device voltage Vis.

At the time t15, the value of the device voltage Vis is raised to become equal to the value of the output voltage detection signal VFB. Then, the signal Rs is outputted from the comparator 128. The signal Rs inputted to the reset terminal R of the RS flip-flop 129 resets the RS flip-flop 129, by which the level of the second control signal Qp is shifted to the L level. At the time t15, no pulse of the first control signal Cp is outputted from the checking pulse generator 110. This brings the level of the control signal VGS outputted from the OR circuit 130 to the L level, by which the switching device 50 is brought into a nonconductive state to lower the device voltage Vis down to the ground voltage.

In the period from the time t12 to the time t15, the switching device 50 was in a conductive state. Hence, at the time t15 at which the switching device 50 is brought into the nonconductive state, the capacitor 43 is charged by a voltage induced in the secondary winding 32, by which the output voltage Vo is increased before being decreased. In this case, however, the increased output voltage Vo is still below the output voltage target value. Thus, the output voltage detection signal VFB still has a value exceeding the voltage V2. This makes the level of the signal Fc, outputted from the comparator 126, held at the H level.

At the time t16, the level of the signal Fc is held at the H level. Hence, the one-shot pulse Ps generated at the time t16 is inputted to the S terminal of the RS flip-flop 129 being reset. This makes the second control signal Qp, the level of which became the L level at the time 11, outputted from the RS flip-flop 129 to the outside of the output voltage detecting section 70 to be inputted to the OR circuit 130 with the level thereof shifted to the H level from the time t12.

The second control signal Qp with the level thereof shifted to the H level from the time t16 makes the control signal VGS generated through the OR circuit 130 shift to the H level, by which the switching device 50 is brought into a conductive state to raise the device voltage Vis.

At the time t19, the value of the device voltage Vis is raised to become equal to the value of the output voltage detection signal VFB. Then, the signal Rs is outputted from the comparator 128. The signal Rs inputted to the reset terminal R of the RS flip-flop 129 resets the RS flip-flop 129, by which the level of the second control signal Qp is shifted to the L level. At the time t19, no pulse of the first control signal Cp is outputted from the checking pulse generator 110. This brings the level of the control signal VGS outputted from the OR circuit 130 to the L level, by which the switching device 50 is brought into a nonconductive state to lower the device voltage Vis down to the ground voltage.

In the period from the time t16 to the time t19, the switching device 50 was in a conductive state. Hence, at the time t19 at which the switching device 50 is brought into the nonconductive state, the capacitor 43 is charged by a voltage induced in the secondary winding 32, by which the output voltage Vo is increased to exceed the output voltage target value before being decreased while still exceeding the output voltage target value. Along with this, the value of the output voltage detection signal VFB becomes lower than the voltage value V2. This brings the level of the output signal Fc, outputted from the comparator 126, to the L level to cause the one-shot circuit 125 to stop the generation of the one-shot pulse Ps. Thus, both of the levels of the signals inputted to the set terminal and the reset terminal of the RS flip-flop 129 become the L levels to keep the level of the second control signal Qp at the L level. From the time t19 to the time t20, no pulse of the first control signal Cp is inputted. Hence, the state of the switching power supply system 1 becomes the state similar to that immediately after the time t4.

In the second embodiment, the absence of the burst circuit 122 results in a small increase in the output voltage detection signal VFB only by the pull-up resistor 121. This shortens the time elapsed until the value of the device voltage Vis becomes equal to the value of the output voltage detection signal VFB. Therefore, the intervals at which the signals Rs are outputted from the comparator are shortened to make the frequency for switching the switching device 50 higher than the frequency in the first embodiment. However, since no burst circuit 122 is necessary, the circuit size can be made smaller than that in the first embodiment.

According to the invention explained in the foregoing, advantages as will be explained in the following can be obtained.

In each of the embodiments, the checking pulse generator 110 generates the pulses of the first control signal Cp at specified first intervals to thereby allow the output voltage Vo to be stably detected. Moreover, the switching controlling section 120 outputs the second control signal Qp so that the value of the output voltage Vo becomes equal to or more than the output voltage target value only when the value of the output voltage detection signal VFB becomes equal to or more than the specified constant voltage value V2. Therefore, without the use of a photocoupler, the output voltage Vo can be stably outputted with a low power loss.

While the present invention has been particularly shown and described with reference to the preferred embodiments thereof, it will be understood by those skilled in the art that the foregoing and other changes in form and details can be made therein without departing from the spirit and scope of the present invention.

What is claimed is:

1. A switching power supply system including:
   a transformer comprising:
     a primary winding to which a DC voltage is inputted;

a secondary winding wound in a direction opposite to a winding direction of the primary winding; and a tertiary winding wound in the direction opposite to the winding direction of the primary winding;

a switching device connected to the primary winding to carry out switching operations based on a first control signal, the first control signal comprising a series of pulses, and on a second control signal;

an output voltage producing section rectifying and smoothing a voltage generated in the secondary winding to produce an output voltage;

an output voltage detecting section detecting a voltage generated in the tertiary winding to produce an output voltage detection signal based on the detected voltage;

a checking pulse generator generating the pulses of the first control signal at specified first intervals; and a switching controlling section producing the second control signal based on the output voltage detection signal to control the switching operations of the switching device;

wherein a first interval of the specified first intervals is longer than each of intervals at which the second control signal is generated.

2. The switching power supply system of claim 1, wherein a pulse width of a pulse of the first control signal is determined so as to satisfy a time length which the output voltage detecting section requires for carrying out sampling of a voltage generated in the tertiary winding by the pulse of the first control signal.

3. The switching power supply system of claim 2, wherein the switching controlling section includes a burst circuit that lengthens a width of the second control signal in a light load state.

4. The switching power supply system of claim 2, wherein the checking pulse generator, the switching controlling section and the output voltage detecting section are formed on a same semiconductor substrate.

5. The switching power supply system of claim 1, wherein the switching controlling section includes a burst circuit that lengthens a width of the second control signal in a light load state.

6. The switching power supply system of claim 5, wherein the checking pulse generator, the switching controlling section and the output voltage detecting section are formed on a same semiconductor substrate.

7. The switching power supply system of claim 1, wherein the checking pulse generator, the switching controlling section and the output voltage detecting section are formed on a same semiconductor substrate.

8. The switching power supply system of claim 1, wherein the switching controlling section includes a burst circuit that lengthens a width of the second control signal in a light load state.

9. The switching power supply system of claim 1, wherein the checking pulse generator, the switching controlling section and the output voltage detecting section are formed on a same semiconductor substrate.

10. A control circuit of a switching power supply system wherein the switching power supply system comprises:

a transformer comprising:
a primary winding to which a DC voltage is inputted;
a secondary winding wound in a direction opposite to a winding direction of the primary winding; and
a tertiary winding wound in the direction opposite to the winding direction of the primary winding;

a switching device connected to the primary winding to carry out switching operations based on a first control signal, the first control signal comprising a series of pulses, and on a second control signal; and an output voltage producing section rectifying and smoothing a voltage generated in the secondary winding to produce an output voltage, the control circuit including:

an output voltage detecting section detecting a voltage generated in the tertiary winding to produce an output voltage detection signal based on the detected voltage;

a checking pulse generator generating the pulses of the first control signal at specified first intervals; and a switching controlling section producing the second control signal based on the output voltage detection signal to control the switching operations of the switching device;

wherein a first interval of the specified first intervals is longer than each of intervals at which the second control signal is generated.

11. An apparatus, comprising:

a sampling device configured to sample an output voltage of a winding of a transformer, and output a corresponding sampled voltage signal;

a first control signal device configured to output a first control signal that at least partly controls switching of a switching device of the transformer; and a second control signal device configured to output a second control signal that, with the first control signal, at least partly controls switching of the switching device, based at least partly on the sampled voltage signal;

wherein the first control signal is configured to include a state having a duration permitting the sampling device to output the sampled voltage signal, for control of the switching device of the transformer by the first control signal device and the second control signal device in a transition of the transformer;

wherein the transition is from a no load state to an at least partly loaded state; and wherein the first control signal is configured as a series of pulses generated at predetermined intervals, and an interval of the predetermined intervals is longer than each of intervals at which the second control signal is generated.

12. The apparatus of claim 11, further comprising a logic device having as inputs the first control signal and the second control signal, and configured to output a switching signal to the switching device.

13. The apparatus of claim 12, wherein the logic device comprises a logical OR device.

14. The apparatus of claim 11, wherein the second control signal is configured to change state at least partly in response to the sampled voltage signal.

15. The apparatus of claim 14, wherein the second control signal device is further configured to output the second control signal based at least partly on a voltage device signal corresponding to a state of the switching device.

16. The apparatus of claim 15, wherein the winding is a tertiary winding of the transformer, and the switching device is coupled between a primary winding of the transformer and a voltage device corresponding to the voltage device signal.

* * * * *